United States Patent [19]

Nishi et al.

[11] Patent Number: 5,231,282
[45] Date of Patent: Jul. 27, 1993

[54] OPTICAL WRITING TYPE LIQUID CRYSTAL LIGHT VALVE AND WRITING APPARATUS THEREFOR

[75] Inventors: Kazuro Nishi; Hajime Nakajima; Masaya Mizunuma; Tatsuo Masumi; Shigeyuki Kaho; Tsuyoshi Horikawa; Shin Tahata, all of Amagasaki, Japan

[73] Assignee: Mitsubishi Denki Kabushiki Kaisha, Tokyo, Japan

[21] Appl. No.: 822,109

[22] Filed: Jan. 17, 1992

[30] Foreign Application Priority Data

Jan. 22, 1991 [JP] Japan ................... 3-005648
Jan. 29, 1991 [JP] Japan ................... 3-009032
Mar. 6, 1991 [JP] Japan ................... 3-039780

[51] Int. Cl.$^5$ ............................ H01J 31/50
[52] U.S. Cl. ..................... 250/214 LA; 359/72
[58] Field of Search ............. 250/213 R, 213 VT; 359/72, 242, 252, 253, 299, 315

[56] References Cited

U.S. PATENT DOCUMENTS 3,971,931 7/1976 Jehle .
4,695,717 9/1987 Hirai et al. ............... 250/213 R
4,941,735 7/1990 Moddel et al. ............ 250/213 R
5,144,463 9/1992 Hatano et al. .

FOREIGN PATENT DOCUMENTS 59-216126 12/1984 Japan .
62-102232 5/1987 Japan .

Primary Examiner—David C. Nelms

[57] ABSTRACT

A liquid crystal light valve has a photoconductive layer between a pair of electrodes, and a liquid crystal layer. The resistivity of the photoconductive layer at the portion which is irradiated with light is reduced by partial light irradiation. By applying a voltage between the electrodes in this state, the voltage is applied to the liquid crystal layer in the portion which is irradiated with light and the crystalline structure at this portion is changed, thereby enabling image data writing. The photoconductive layer is a laminate of an amorphous Si film and an inorganic insulating film disposed on the electrode side, which structure suppresses the carrier injection from the electrode to the amorphous Si film. The polarity of a voltage for writing image data into the liquid crystal light valve is inverted for every horizontal scanning operation. That is, writing of black portions on a white background and writing of white portions on a black background are alternately executed. It is therefore possible to write data on one line and erase the data on the next line by a voltage of one polarity. By periodically setting a period in which no voltage is applied during writing, writing error caused by stored charges is prevented.

3 Claims, 10 Drawing Sheets

FIG. I
PRIOR ART
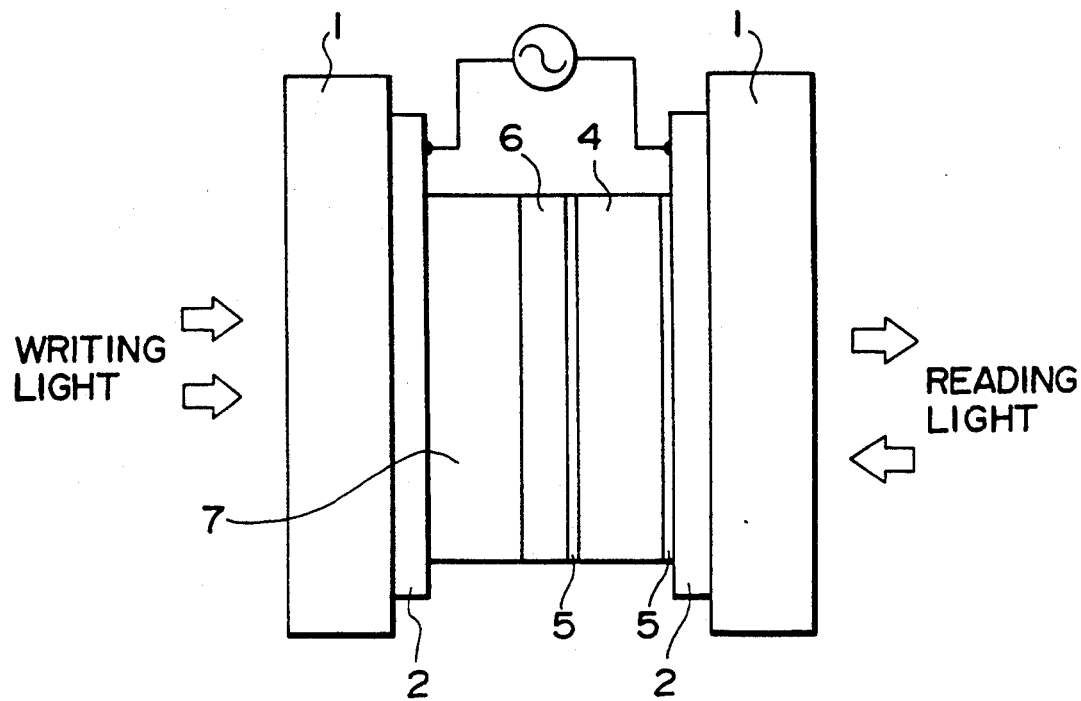
FIG. 2
PRIOR ART
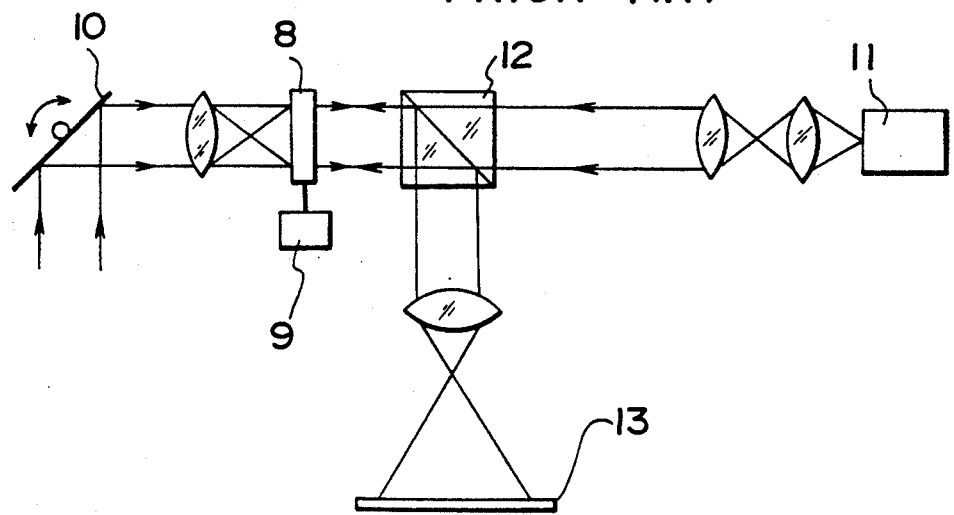

FIG. IIA
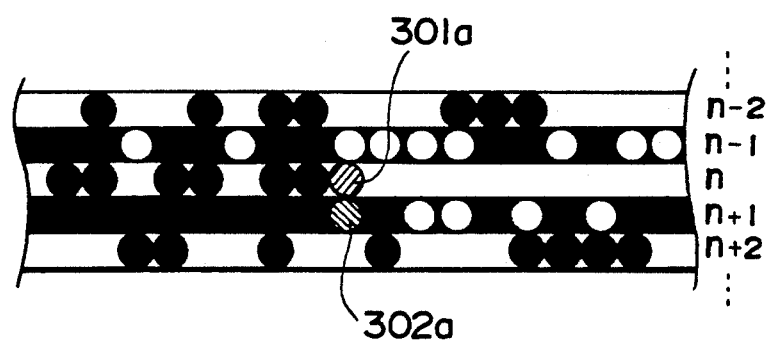
FIG. IIB
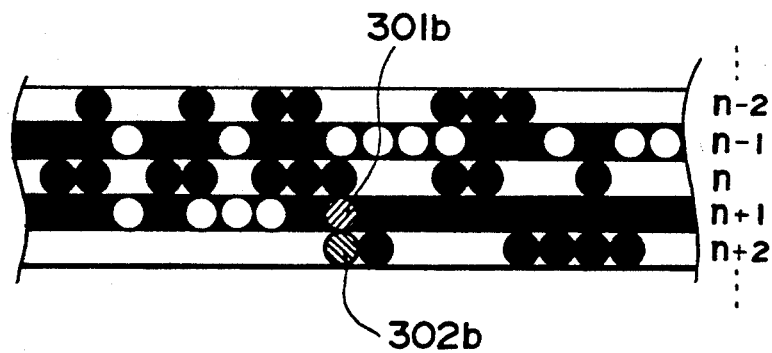

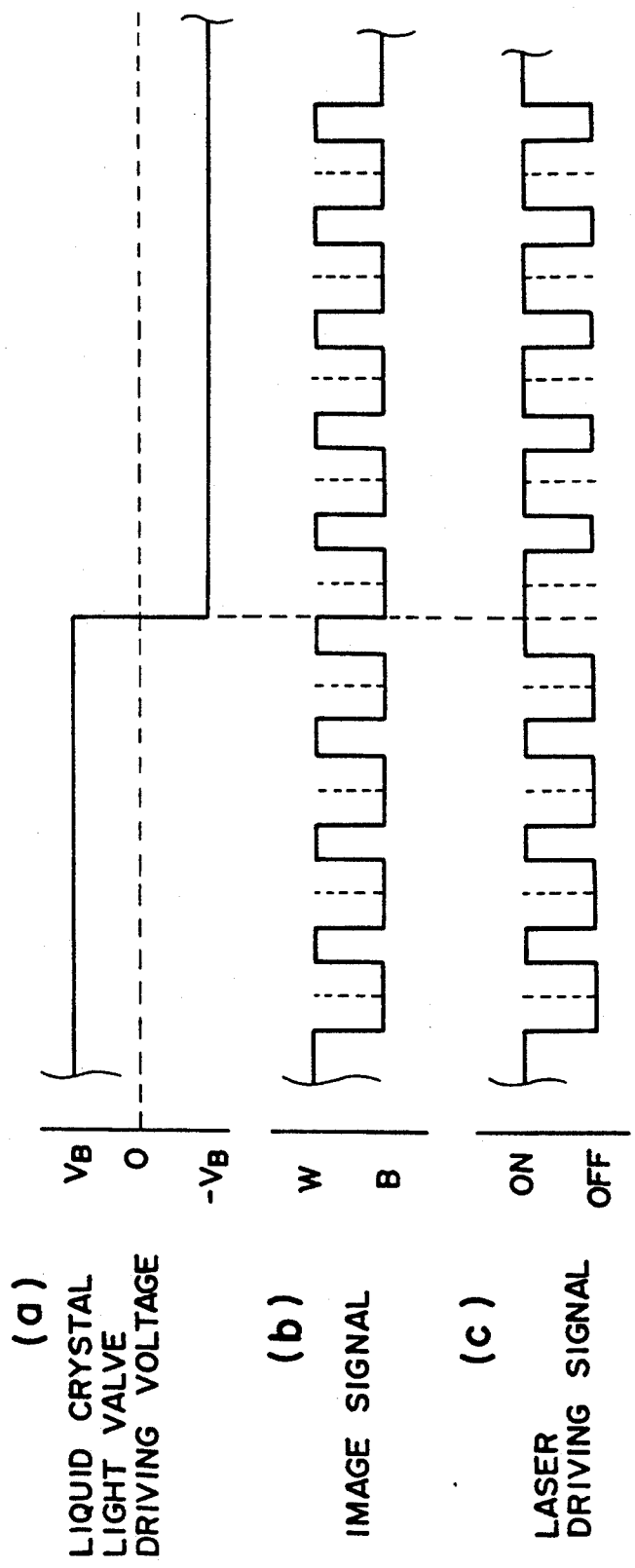

OPTICAL WRITING TYPE LIQUID CRYSTAL LIGHT VALVE AND WRITING APPARATUS THEREFOR

BACKGROUND OF THE INVENTION

1. Field of the Invention

The present invention relates to an optical writing type liquid crystal light valve which is used for a large-screen high-definition projection display and the like, a method of driving the same and a writing apparatus used for the same.

2. Description of the Related Art

FIG. 1 is a sectional view of a conventional light valve which is described in, for example, CONFERENCE RECORD OF 1990 INTERNATIONAL TOPICAL MEETING ON OPTICAL COMPUTING (1990), 9B3, pp. 17 to 18.

In FIG. 1, the reference numeral 1 represents a glass substrate, 2 a transparent conductive film composed of ITO (indium tin oxide) or the like, 4 a liquid crystal layer, 5 an orientation film for orientating a liquid crystal, 6 a reading light reflecting plate, and 7 a photoconductive layer composed of a hydrogenated amorphous silicon film which has a high electrical resistance.

The operation of this light valve will now be described. When data is written into a liquid crystal display device, a predetermined bias is first applied between an opposing pair of transparent conductive films. In this state, writing light having any given bright and dark space pattern is caused to enter the photoconductive layer 7. At this time, the photoconductive layer 7 has a high resistance at the points which are not irradiated with the writing light, while the resistance of the photoconductive layer 7 is lowered at the points which are irradiated with the writing light, due to the photoconductive effect. In this way, the carrier distribution which corresponds to the space pattern of the writing light is formed on the interface between the photoconductive layer 7 and the liquid crystal layer 4. In correspondence with the carrier distribution, a spatial distribution is produced due to the birefringence or the optical rotational power of the liquid crystal. For example, if a ferroelectric liquid crystal is used for the liquid crystal layer 4, the spatial distribution due to the birefringence of the liquid crystal layer 4 which corresponds to the space pattern of the incident light is produced.

The thus-written spatial distribution caused by the birefringence or the optical rotational power of the liquid crystal 4 is read by causing reading light as polarized rays to enter the liquid crystal layer 4 from the right-hand side in FIG. 1 through a polarizer and projecting the light reflected by the reading light reflecting plate 6 onto a screen through the polarizer.

FIG. 2 shows the structure of a liquid crystal display device as a projection display. The reference numeral 8 represents a liquid crystal light valve and 9 a voltage applying means. As the light writing means, a laser light source such as a CRT, or an He-Ne laser or a semiconductor laser combined with a two-dimensional scanner 10 is used. The reference numeral 11 denotes a reading light source, 12 a polarization beam splitter, and 13 a screen.

The laser light is scanned by the two-dimensional scanner 10 and an image is written into the liquid crystal valve 8. The liquid crystal valve 8 is irradiated with the light from the reading light source 11 which is polarized through the polarization splitter 12 as predetermined polarized rays. Since the liquid crystal valve 8 reflects the polarized rays respectively which are based on the written data, the polarized rays having a two-dimensional distribution which is determined by the written data are separated by the polarization beam splitter 12, and the image is displayed on the screen 13.

In this liquid crystal display device, the writing light and the reading light are emitted from different light sources. It is therefore possible to change the wavelength of a two-dimensional image or change incoherent light into coherent light by using this liquid crystal display device. Since the liquid crystal display device has a higher spatial resolution in principle than a light valve using BSO (Bismuth Silicon Oxide), it is possible to incorporate the liquid crystal display device into a large-screen high-definition projection system.

A liquid crystal having bistability, which is a component of a liquid crystal light valve, will now be described briefly.

As a liquid crystal which exhibits bistability, a ferroelectric liquid crystal is conventionally used. The operation of a ferroelectric liquid crystal will be described in the following.

In FIGS. 3 and 4, the reference numeral 14 represents a ferroelectric liquid crystal molecule. A long and narrow liquid crystal molecule such as that shown in FIGS. 3 and 4 exhibits an anisotropic reflective index between the major axial direction and the minor axial direction. The liquid crystal has spontaneous polarization 15, 16 in the vertical direction with respect to the major axis of the molecule in correspondence with the externally applied electric field. Even after the electric field is cut, the orientation of the liquid crystal remains stable. When this liquid crystal is used for a display device, the major axes of the liquid crystal molecules are oriented approximately parallel to the substrate. As shown in FIG. 4, the liquid crystal molecules are oriented in a first orientation stable state with respect to an electric field E15 applied in the direction of the reverse side of the drawing, and in a second orientation stable state 16 with respect to an electric field applied in the opposite direction to the reverse side of the drawing.

The change in the orientation due to an electric field is caused only when the energy applied from outside the liquid crystal, namely, the product of the electric field intensity (voltage) and the voltage applying time exceeds a constant critical value (the threshold property). The critical value of the product of the electric field intensity (voltage) and the voltage applying time is called a critical pulse area and hereinunder will be referred to as "CPA". When the orientation state of the liquid crystal is the first orientation stable state, even if the electric field E16 which does not exceed the CPA is applied to the liquid crystal in the direction opposite to the reverse side of the drawing during a certain voltage applying time, the orientation state of the liquid crystal does not change. If the applied voltage exceeds the CPA (this voltage is defined as a threshold voltage (Vth)), however, the orientation stable state of the liquid crystal is inverted.

As described above, although the photoconductive layer 7 has a high resistance in the dark state (hereinunder referred to as "dark resistance"), when the photoconductive layer 7 is irradiated with writing light, the resistance of the photoconductive layer 7 at the portion which is irradiated with the writing light is lowered due to the photoconductive effect, and the voltage applied to the liquid crystal exceeds the threshold (Vth), and the orientation state of the liquid crystal changes. This operation is shown in time series in FIGS. 5a to 5c. The time axes are common to FIGS. 5a to 5c. In FIG. 5a, the symbol Vappl represents the waveform of the voltage applied between the transparent conductive films 2, A a reset pulse and B a writing period. The reference numeral 21 represents a writing voltage pulse, and 22 and 23 erasing light and writing light, respectively, projected onto the photoconductive layer. In FIG. 5b, the symbol $V_{LC}$ represents a voltage applied to the liquid crystal layer, and in FIG. 5c, the symbol Irrl represents the intensity of the reflected reading light at the portion which is irradiated with light.

The space between the opposing electrodes (transparent electrodes) 2 is first irradiated with erasing light in synchronism with a reset pulse for applying −Vth so that the entire liquid crystal layer assumes one orientation stable state. The liquid crystal layer is then irradiated with writing light having a predetermined two-dimensional pattern in synchronism with the writing period. Since a voltage exceeding the threshold Vth is applied to the liquid crystal layer at the portion which is irradiated with the light due to the photoconductive effect, the orientation state changes and the intensity of reading light is accordingly distributed.

By using a laser light source combined with the two-dimensional scanner 10 shown in FIG. 2 as the writing light projecting means, it is possible to record any given two-dimensional image on a liquid crystal light valve. The thus-written image is obtained by projecting the reading light with which the liquid crystal layer is irradiated through a polarization beam splitter 12 and which is separated by the polarization beam splitter 12, optically rotated in the liquid crystal layer 4, and reflected by the reading light reflecting plate 6 onto the screen 13. The optical rotation by the liquid crystal reaches its maximum when the angle $2\theta$ between the first orientation stable state and the second orientation stable state is 45°.

In order to realize the writing operation by the liquid crystal display device, it is necessary that the resistance of the photoconductive layer 7 which is not irradiated with writing light is sufficiently higher than that of the liquid crystal layer 4, while the resistance of the photoconductive layer 7 which is irradiated with writing light is not more than the resistance of the liquid crystal layer 4. In order to realize the high spatial resolution of the device, it is necessary that the film thicknesses of the liquid crystal layer 4 and the photoconductive layer are small in addition to the condition that the dark resistance of the photoconductive layer is sufficiently high.

In the above-described conventional liquid crystal display device, a hydrogenated amorphous silicon film is used for the photoconductive layer 7, or CdS, crystalline silicon and BSO are conventionally used. Among these, a hydrogenated amorphous silicon film, which is formed by plasma CVD, is advantageous in that it is comparatively easier to set a resistance value in comparison with any other material, in that the adhesiveness with an underlayer is high and in that the photosensitivity in the visible light range is high.

However, the dark resistance of the hydrogenated amorphous silicon film formed by plasma CVD (Chemical Vapor Deposition) is $1 \times 10^9$ to $1 \times 10^{11}$ Ω.cm in the case of a non-doped film, and at most $1 \times 10^{12}$ Ω.cm in the case of what is called a boron lightly doped film.

These resistances cannot be said to be sufficiently higher than the general resistivity $1 \times 10^{11}$ to a$\times 10^{12}$ Ω.cm of a liquid crystal. It is therefore necessary to increase the dark resistance of the hydrogenated amorphous silicon film by some means in the case of using it for the photoconductive layer 7.

For this purpose, a method of making the hydrogenated amorphous silicon film much thicker than the liquid crystal layer 4 (e.g., the hydrogenated amorphous silicon film is formed to a thickness of about 10 μm while the liquid crystal layer 4 is 2 μm thick), and a method of forming the photoconductive layer 7 from a hydrogenated amorphous silicon film having a pin structure and executing the writing operation by applying a reverse bias to the pin photodiode are conventionally adopted. However, if the thickness of the photoconductive film 7 is increased, the spatial resolution of the liquid crystal display device is disadvantageously lowered. In addition, if the photoconductive layer 7 has a pin structure, the waveform of the voltage applied to the liquid crystal layer 4 becomes different from the waveform of the driving voltage, so that the liquid crystal deteriorates during periods of long driving.

The operation temperature of the liquid crystal display device is limited to a definite temperature range. If this temperature range is higher than room temperature, the dark resistance of the hydrogenated amorphous silicon film and the activating energy of the reverse current of the pin photodiode are higher than those of a liquid crystal, and it is thus difficult to make the dark resistance of the photoconductive layer 7 higher than the resistance of the liquid crystal layer 4.

In the above-described conventional liquid crystal display device, if a CRT is used as an optical writing means, the resolution of the optical writing type liquid crystal light valve is limited by the resolution of the CRT as the light projecting means. On the other hand, if a laser light source combined with the two-dimensional scanner shown in FIG. 2 is used as the optical writing means, it is possible to increase the spatial information density of the writing light by converging the laser beam onto the photoconductive layer and using this beam for raster scanning, so that the optical information recorded with a high resolution which is characteristic of an optical writing type liquid crystal light valve can be expected.

As described above, the dark resistance of the photoconductive layer 7 cannot be said to be sufficiently higher than the resistance of the liquid crystal layer 4.

Therefore, if a writing voltage is applied between the transparent conductive films 2 during the writing period B, a distributed voltage which is determined by the resistance between the photoconductive layer 7 and the liquid crystal layer 4 is applied to the liquid crystal layer 4. Therefore, if the writing period B is long as in the case of conducting optical writing with high definition by a laser light source combined with the two-dimensional scanner 10, the energy applied to the liquid crystal layer 4 which is not irradiated with light exceeds the CPA, which changes the orientation in the area which is not irradiated with light and the intensity of the reflected light at this portion gradually rises disadvantageously, as indicated by the broken line C in FIG. 5c.

FIG. 6 is a timing chart for explaining the procedure for writing data into a liquid crystal light valve which is applied to a conventional image-forming device described in Japanese Patent Laid-Open No. Hei 1-241528. In this example, a laser beam is converged onto a liquid crystal light valve in order to scan, and an image is written by utilizing the lowering of the resistance of the photoconductive layer 7. In FIG. 6, (a) represents timing for a timing signal generated by a sweep starting signal, (b) timing for a driving field for driving a liquid crystal light valve and (c) timing for a video signal for modulating the laser light.

The operation of the conventional liquid crystal display device will be explained. In writing data into the liquid crystal light valve, raster scanning is conducted by a laser beam through a polygon mirror scanner and a galvanometer mirror scanner, and a square wave having both positive and negative polarities being applied during scanning, as indicated by (b).

The writing operation is carried out at a specific polarity of the driving voltage. In this example, the video signal indicated by (c) is supplied when the polarity is negative and the writing operation is conducted. A positive voltage is applied so as to cancel the direct current component of the pulse during writing and while the voltage is applied, the writing operation is suspended.

In the above-described conventional method of writing data into the liquid crystal light valve, the writing operation must be suspended during the application of a voltage having an opposite polarity to that of the applied writing voltage.

SUMMARY OF THE INVENTION

Accordingly, it is an object of the present invention to eliminate the above-described problems in the prior art, to provide a liquid crystal display device which is capable of matching the dark resistance of a photoconductive layer in the dark state with the resistance of the liquid crystal layer, is capable of obtaining a high spatial resolution, and is capable of a stable operation irrespective of the operation temperature.

It is another object of the present invention to provide a writing apparatus for a liquid crystal light valve which enables a writing operation irrespective of the polarity of the voltage applied, and which also enables partial rewriting.

It is still another object of the present invention to provide a high-definition optical writing type liquid crystal light valve which prevents the inversion of the liquid crystal at the portion which is not irradiated with light during a writing operation.

To achieve this aim, in a first aspect of the present invention there is provided an optical writing type liquid crystal light valve comprising:

a pair of electrodes; a photoconductive layer which is clamped by the pair of electrodes and the conductivity of which is changed by light irradiation; and a liquid crystal layer, the molecular alignment of which changes when a voltage is applied. The photoconductive layer includes an inorganic insulating film formed thereon in such a manner as to face one of the electrodes and a laminate of films formed in such a manner as to face the liquid crystal layer.

According to an optical writing type liquid crystal light valve provided in the first aspect of the present invention, since an inorganic insulating film is provided between the electrode substrate and the hydrogenated amorphous silicon film of the photoconductive layer and the carrier injection is suppressed by the action of the inorganic insulating film, it is possible to increase the dark resistance of the photoconductive layer, thereby producing a liquid crystal display apparatus having good displaying properties. The increase in the dark resistance of the photoconductive layer reduces the blurring of an image caused by the diffusion of the carriers in the horizontal direction, thereby providing a high spatial resolution. In addition, the increase in the dark resistance enables a stable operation even at a high operation temperature.

The inorganic insulating film is preferably an $SiO_2$ film, and the thickness thereof is preferable 20 to 200 nm.

In a second aspect of the present invention, there is provided a writing apparatus for an optical writing type liquid crystal light valve having a photoconductive layer which is clamped by a pair of electrodes and the conductivity of which changes by light irradiation, and a liquid crystal layer, the molecular alignment of which changes in accordance with a voltage applied and which has bistability so as to enable an image signal to be written or erased by light irradiation. The writing apparatus comprises:

a laser beam light source for generating at least a writing laser beam for writing an image signal into the liquid crystal light valve and an erasing laser beam for erasing the contents written into the light valve;

a main scanning circuit for driving at least the two laser beams to be deflected in the direction of a scanning line of the liquid crystal light valve so as to write the image signal by the writing laser beam while erasing the contents written on the next scanning line into which an image signal is to be written;

a timing signal.generator for generating a main scanning starting signal every time the scanning of a scanning line by the laser beams is started by the main scanning circuit;

a polarity change-over switch circuit for inverting the polarity of the image signal for each scan in correspondence with the generation of the main scanning starting signal by the timing signal generator;

a laser source driving circuit for driving the laser source so as to the emit the writing laser beam in accordance with the image signal with the polarity inverted by the polarity change-over switch circuit;

a liquid crystal light valve driving circuit for inverting the polarity of the driving voltage applied to the liquid crystal light valve in correspondence with the generation of the main scanning starting signal by the timing signal generator; and a sub scanning circuit for driving the erasing laser beam and the writing laser beam so as to be deflected such that the erasing laser beam and the writing laser beam scan the next scanning line during each scanning operation.

According to the writing apparatus provided in the second aspect of the present invention, since a writing operation is carried out while the next scanning line is being erased at both polarities of a driving voltage of the liquid crystal light valve, it is possible to realize high-speed laser beam drawing while maintaining the threshold voltage of the liquid crystal and to use the applied voltage of both polarities without waste. Partial writing is also possible.

In a third aspect of the present invention, there is provided a writing apparatus for an optical writing type liquid crystal light valve having a pair of electrodes, a photoconductive layer which is clamped by a pair of electrodes and the conductivity of which is changed by light irradiation, and a liquid crystal layer having bistability so as to enable an image signal to be written or erased by light irradiation, the writing apparatus comprising:

a voltage applying circuit for applying a voltage between the pair of electrodes;

a light projecting device for projecting rays which correspond to an image signal for one frame to the photoconductive layer by two-dimensional scanning and writing the image signal into the liquid crystal layer by lowering the conductivity of the photoconductive layer at the portion which is irradiated with light so as to increase the voltage at that portion which is applied to the liquid crystal layer; and a controller for controlling the voltage applying circuit so as to suspend the application of the voltage between the pair of electrodes at least in a predetermined period during the operation of writing the image signal for one frame by the light projecting device.

According to the writing apparatus for an optical writing type liquid crystal light valve provided in the third aspect of the present invention, the inversion of the liquid crystal layer at the portion which is not irradiated with light caused by the voltage distributed to the liquid crystal layer due to the photoconductive layer having a lower dark resistance than the liquid crystal layer, is suppressed. This means that optical information recording by an easy method is made possible without impairing the high-definition writing property which is characteristic of an optical writing type liquid crystal light valve.

The period during which the application of a voltage is suspended is preferably in the range of 10 to 40% of the writing time. The light projecting device projects rays so as to scan a plurality of scanning lines. The number of times the application of a voltage is suspended is preferably 0.5 to 2 times the number of scanning lines for one frame.

The above and other objects, features and advantages of the present invention will become clear from the following description of the preferred embodiments thereof, taken in conjunction with the accompanying drawings.

BRIEF DESCRIPTION OF THE DRAWINGS

FIG. 1 is a sectional view of a conventional liquid crystal display apparatus;

FIG. 2 shows the structure of a display apparatus using an optical writing type liquid crystal light valve;

FIGS. 11A and 11B are explanatory views of the liquid crystal light valve shown in FIG. 10 in the state of data being written thereinto;

FIG. 12 is a timing chart of a driving signal for a laser light source in the embodiment shown in FIG. 9.

DESCRIPTION OF THE PREFERRED EMBODIMENTS

Figure 7:
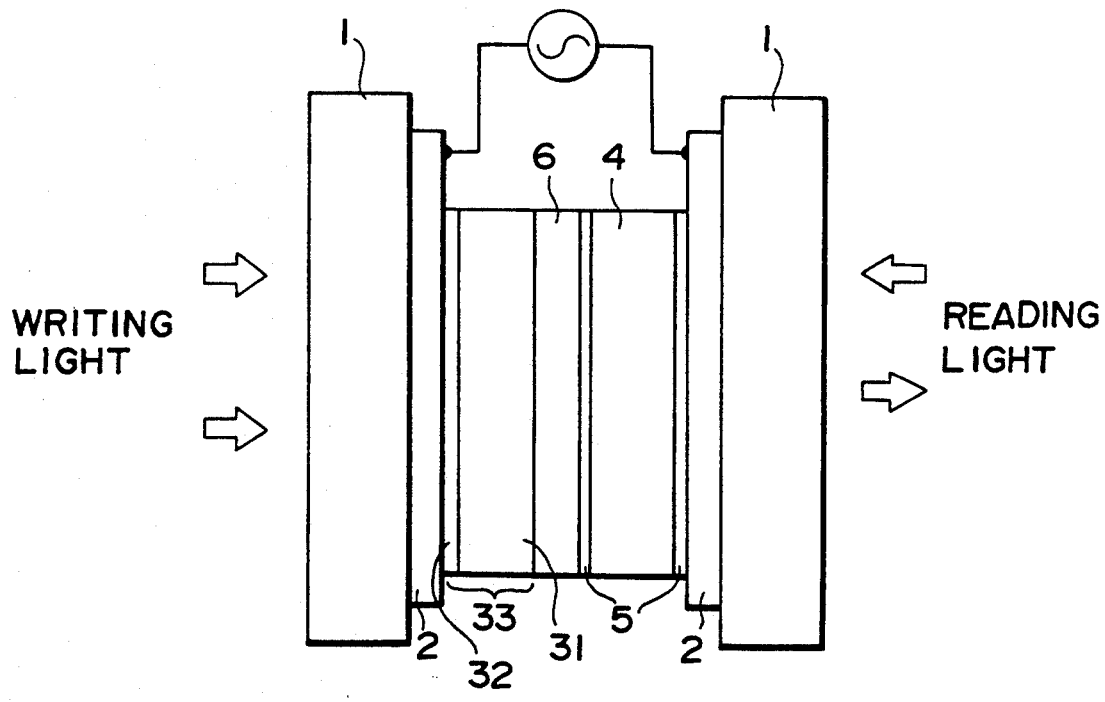
FIG. 7 is a sectional view of a first embodiment of a liquid crystal display apparatus according to the present invention.

Embodiments of the present invention will be explained with reference to the accompanying drawings. FIG. 7 is a sectional view of an embodiment of a liquid crystal display apparatus according to the present invention. In FIG. 7, the reference numeral 1 represents an opposing pair of glass substrates and 2 a transparent conductive film formed on the inner surface of the glass substrate 2. The glass substrates 1 and the transparent conductive films 2 in combination constitute an electrode substrate. The reference numeral 5 denotes an orientation film formed on one of the transparent conductive films 2, and 4 a liquid crystal layer formed on the orientation film 5. A reading light reflecting film 6 is formed on the liquid crystal layer 4 through the orientation film 5. An inorganic insulating film 32 composed of a silicon oxide film is formed on the other transparent conductive film 2 and a hydrogenated amorphous silicon film 31 is formed on the inorganic insulating film 32. The inorganic insulating film 32 and hydrogenated amorphous silicon film 31 constitute a photoconductive layer 33. The other surface of the hydrogenated amorphous silicon film 31 is integrally provided with the reading light reflecting film 6.

In manufacturing the liquid crystal display apparatus having the above-described structure, after an ITO film was formed on the glass substrate 1 as the transparent conductive film 2, the inorganic insulating film 32 composed of $SiO_2$ was formed on one of the transparent conductive film 2 by sputtering, except for at the electrode terminal leading portions. The thickness of the inorganic insulating film 32 was 20 to 200 nm. The hydrogenated amorphous silicon film 31 was then formed on the inorganic insulating film 32 by using silane gas and diborane gas by plasma CVD to a thickness of 3 $\mu$m. A liquid crystal cell composed of the orientation film 5, the liquid crystal layer 4 and the reading light reflecting film 6 was formed between the hydrogenated amorphous silicon film 31 and the other transparent electrode film 2. For the liquid crystal layer 4, a ferroelectric liquid crystal CS-1014 (produced by Chisso Corporation) was used. An obliquely deposited SiO film was used as the orientation film 5. The cell gap of the liquid crystal was 2 $\mu$m. The temperature of the SmC* phase of the liquid crystal at which the liquid crystal is used for displaying operation was 40° to 50° C. A multi-layer dielectric film formed by deposition was used as the reading light reflecting film 6.

The operation temperature of the liquid crystal display apparatus was maintained at 45°. The resistivity of the liquid crystal at this operation temperature was about $3.3 \times 10^{11}$ $\Omega$.cm and the resistivity of the hydrogenated amorphous silicon film 31 in a dark state was about $1 \times 10^{11}$ Ω.cm.

The operation of this embodiment will now be explained. The main operations for writing and reading are the same as in the related art. When a bias is applied between the transparent conductive films 2 in a dark state, since the carrier injection from the transparent conductive films 2 to the hydrogenated amorphous silicon film 31 is suppressed by virtue of the inorganic insulating film 32 which is clamped between the hydrogenated amorphous silicon film 31 and the transparent conductive film 2, the effective dark resistance of the photoconductive layer 32 increases in comparison with the structure of a conventional apparatus. The resistance value of the photoconductive layer 33 in a dark state can be increased or decreased by varying the thickness of the inorganic insulating film 32. The photoconductive layer 33 is therefore capable of sufficiently coping with the operation at a high temperature, which is conventionally difficult due to the lowering of the resistance of the hydrogenated amorphous silicon film 31.

Under irradiation of the writing light, if a voltage applied to the transparent conductive film and the thickness of the inorganic insulating film 32 are appropriately selected, a breakdown is produced is the inorganic insulating film 32 due to the lowering of the resistance of the hydrogenated amorphous silicon film 31. This breakdown leads to the lowering of the resistance of the entire photoconductive layer 33, and, as a result, a bias is applied to the liquid crystal layer 4.

In order to make the merits of the above-described liquid crystal display apparatus clear, samples of a liquid crystal displaying apparatus which were provided with the inorganic insulating films 32 having various thicknesses were prepared. One of which was not provided with an inorganic insulating film 32. The displaying properties of these samples were compared with each other. The results are shown in Table 1.

TABLE 1

|  | Sample No. | | | | |
|---|---|---|---|---|---|
|  | 1 | 2 | 3 | 4 | 5 |
| Thickness of SiO$_2$ film | 0 | 10 | 30 | 100 | 300 |
| Displaying properties |  |  |  |  |  |
| Spatial resolution (1 p/mm) | 30 | 30 | 60 | 100 | 30 |
| Writable voltage region (V) | 10 to 2 | 10 to 12 | 13 to 20 | 19 to 30 | 26 to 40 |

Data was written into the liquid crystal display apparatus by applying a rectangular voltage pulse of 100 nsec duration in the state in which parallel He-Ne laser rays were caused to enter the photoconductive layer 33 through a mask pattern for evaluating resolution. The intensity of the writing light was 10 μW/cm$^2$. Table 1, the maximum value of the spatial resolution when the voltage of the rectangular voltage pulse for writing was varied and the voltage region which allowed writing are shown as the displaying properties.

By clamping the inorganic insulating film 32 of a silicon oxide film between the transparent conductive film 2 and the hydrogenated amorphous silicon film 31, the resolution of the liquid crystal display apparatus was improved to about 100 lp/mm. This is considered to be because the blurring of the image caused by the diffusion of carriers in the horizontal direction was reduced due to the increase in the effective dark resistance of the photoconductive layer 33. In addition, since the voltage required for writing was increased and, further, the voltage range which allows writing was increased with the increase in the thickness of the inorganic insulating film 32, a stable writing operation was enabled. These advantages are prominent when the thickness of the inorganic insulating film 32 is not less than 20 nm.

However, if the thickness of the inorganic insulating film 32 exceeds 200 nm, since the lowering of the resistance of the photoconductive layer 33 is reduced, it is necessary to greatly increase the voltage applied or the quantity of light for writing. In addition, due to the lowering of the capacitance of the photoconductive layer 33, the blurring of the image increases. For these reasons, it is obvious that the appropriate thickness of the inorganic insulating film 32 is 20 to 200 nm.

Figure 8:
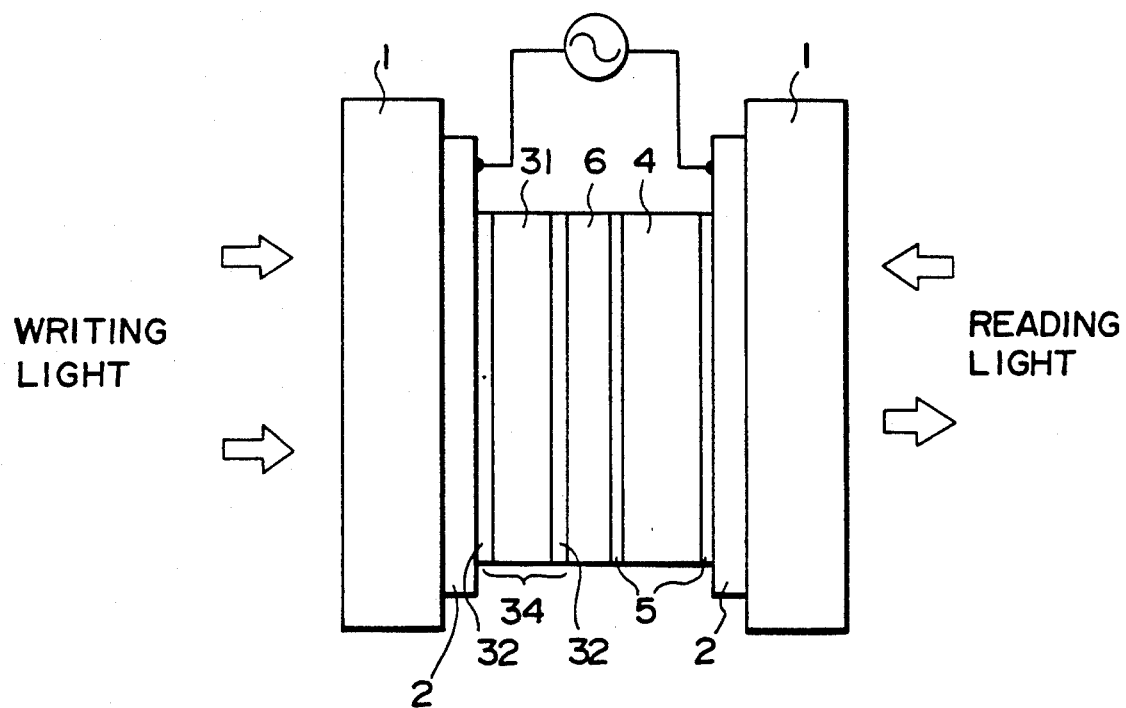
FIG. 8 is a sectional view of a second embodiment of a liquid crystal display apparatus according to the present invention.

FIG. 8 shows the structure of a second embodiment of a liquid crystal display apparatus according to the present invention. In this embodiment, the inorganic insulating films 32 composed of a silicon oxide film are formed on both sides of the hydrogenated amorphous silicon film 31, thereby constituting a photoconductive layer 34. The other structures are the same as in the first embodiment.

In the second embodiment, one of the inorganic insulating films 32 is clamped between the transparent conductive film 2 and the hydrogenated amorphous silicon film 31 and increases the dark resistance of the photoconductive layer 34. Since the photoconductive layer 34 exhibits approximately the same current/voltage characteristic irrespective of the polarity of the voltage applied thereto, it is possible to prevent the deterioration of the liquid crystal which is conventionally caused when a pin photodiode is used for the photoconductive layer 34.

In both of the above-described embodiments, the liquid crystal display apparatus is what is called a reflection type liquid crystal display apparatus which has the reading light reflecting film 6. The reading light reflecting film 6 is provided in order to increase the efficiency of the reading light and to separate the photoconductive layer 33 (34) from the optical reading system. It is therefore possible to use the liquid crystal display apparatus of the present invention as a transmission type liquid crystal display apparatus by omitting the reading light reflecting film 6 and using reading light having a wavelength which is out of the sensitivity range of the photoconductive layer 33 (34). In this case, it is also possible to improve the displaying properties by forming the photoconductive layer 33 (34) having the above-described structure. Although a ferroelectric liquid crystal is used for the liquid crystal layer 4, it is possible to use twist nematic liquid crystal, guest-host type liquid crystal or liquid crystal dispersion type polymer instead. In addition, although an SiO$_2$ film is used as the inorganic insulating film 32 in these embodiments, an SiN or SiON film may be used instead.

Figure 9:
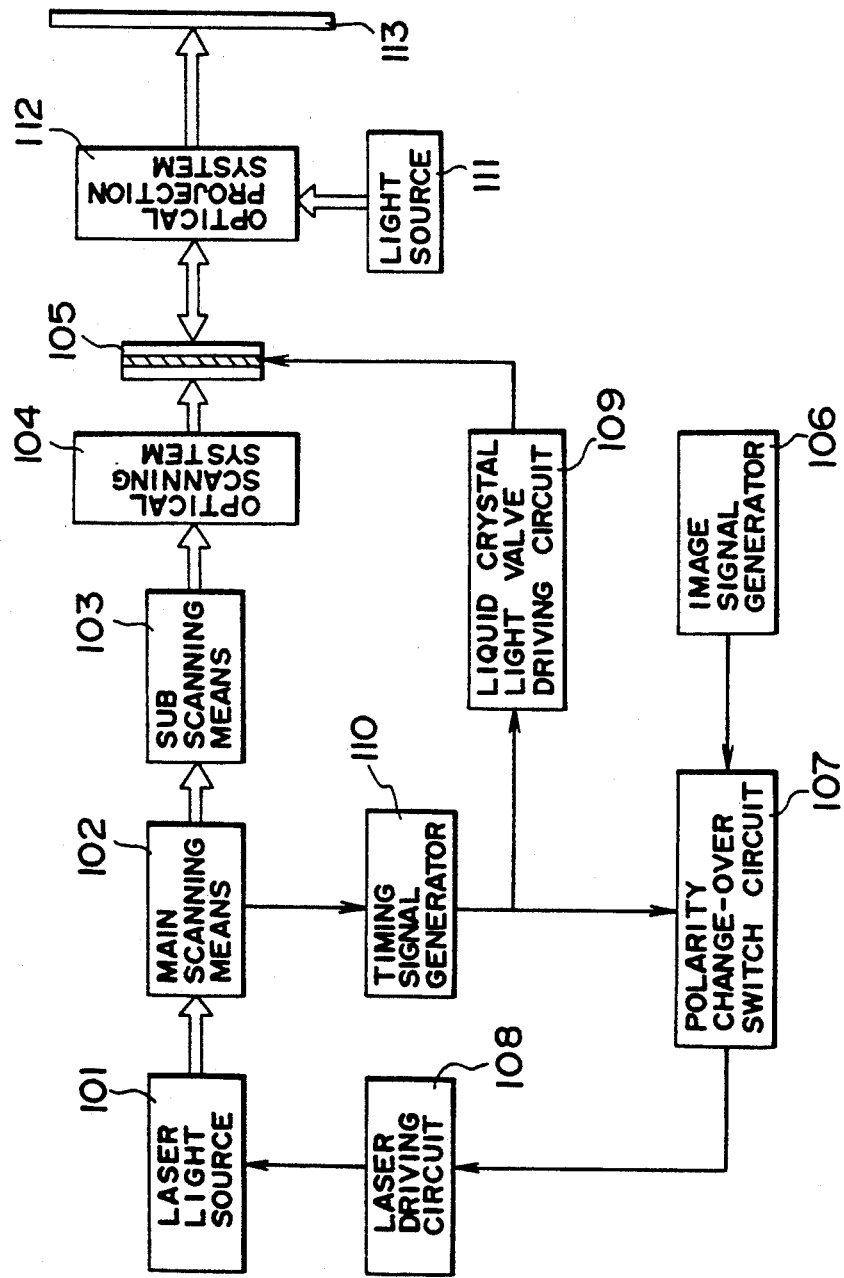
FIG. 9 is a block diagram of an embodiment of a writing apparatus for a liquid crystal light valve according to the present invention.

An embodiment of a writing apparatus for a liquid crystal light valve according to the present invention will be explained hereinunder. FIG. 9 is a block diagram of the structure of this embodiment. In FIG. 9, the reference numeral 101 represents a laser light source for generating two spot beams, 102 a main scanning device for deflecting the laser beam which is emitted from the laser light source 101 in the horizontal direction, 103 a sub scanning device for deflecting the laser beam in the vertical direction, 104 an optical scanning system for converging the beam deflected by the main scanning device 102 and the sub scanning device 103 for the scanning operation, and 105 a liquid crystal light valve for storing the portion which is irradiated with light.

The reference numeral 106 denotes an image signal generator. The image signal generated by the image signal generator 106 is inputted to a polarity change-over switch circuit 107, which switches the image signal every scanning operation in accordance with the timing signal supplied from a timing signal generator 110. In other words, when black portions are written on a white background during one scanning operation, white portions are written on a black background in the next.

The image signal with the polarity switched by the polarity change-over switch circuit 107 is inputted to a laser driving circuit 108 which drives the laser light source 101.

A liquid crystal light valve driving circuit 109 applies a square wave having both polarities to the liquid crystal light valve 105 in accordance with the timing signal 110 supplied from the timing signal generator 110. The timing signal generator 110 detects the initiation of horizontal sweeping by the main scanning device 102 and outputs a timing signal to the polarity change-over switch circuit 107 and the liquid crystal light valve driving circuit 109, as described above.

A light source 11 generates projecting rays for displaying the image on the liquid crystal light valve 105. The rays are projected onto the liquid crystal light valve 105 through an optical projection system 112 so as to read out the image on the liquid crystal light valve 105 and display the image on a screen 113.

Figure 10:
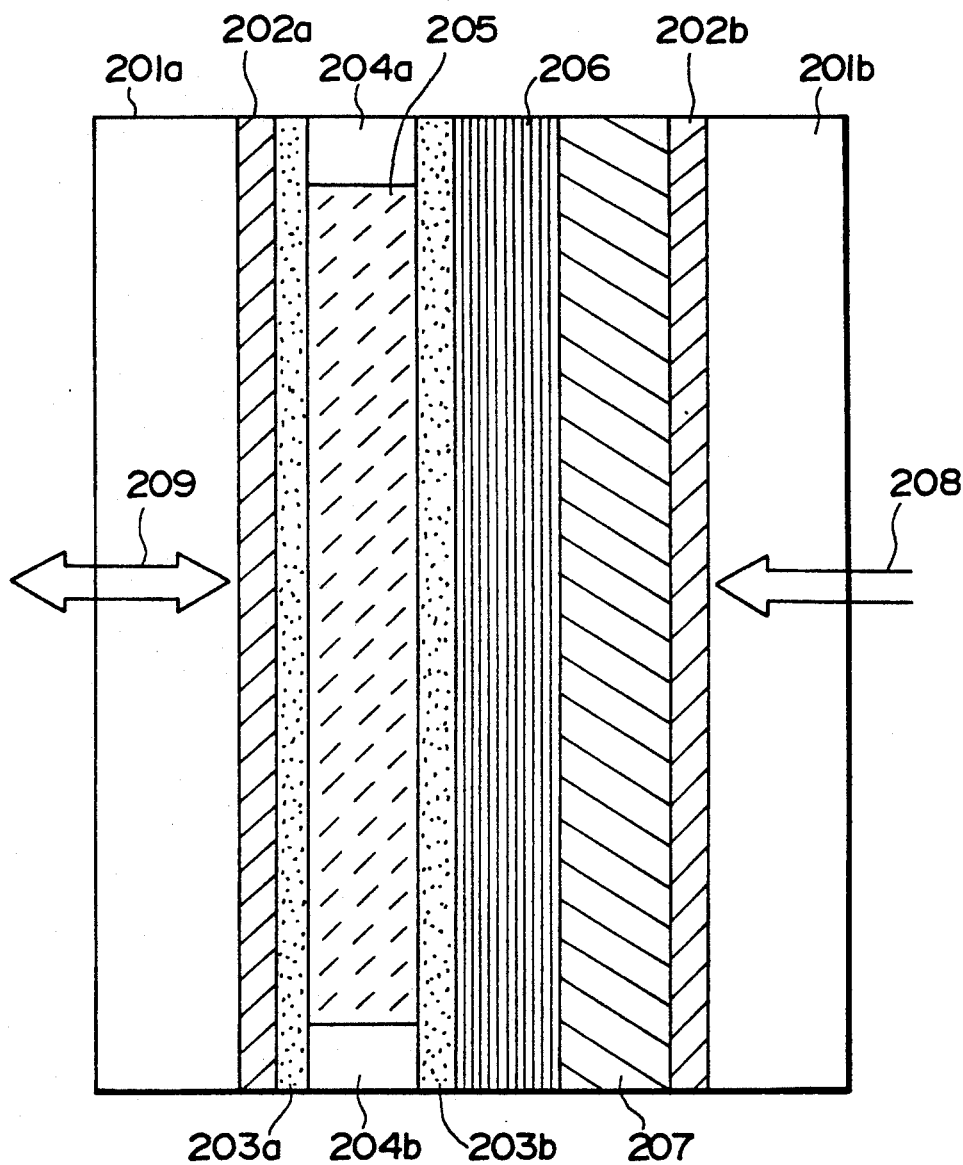
FIG. 10 is an enlarged sectional view of the structure of the liquid crystal light valve for the embodiment shown in FIG. 9.

As the liquid crystal light valve 105, those provided with an inorganic insulating film such as those shown in FIGS. 7 and 8 are preferable, but a light valve such as that shown in FIG. 10 may also be used. FIG. 10 is an enlarged sectional view of a liquid crystal light valve. On the inside surfaces of an opposing pair of glass substrates 201a, 201b, transparent electrodes 202a, 202b are formed respectively. A photoconductor 207 and a multi-layer dielectric film mirror 206 are connected to the transparent electrode 202b. A liquid crystal 205 is clamped between the multi-layer dielectric film mirror 206 and the transparent electrode 202a through liquid crystal orientation films 203b and 203a, respectively. The upper and lower ends of the liquid crystal 205 are held by spacers 204a and 204b, respectively.

The operation of the liquid crystal light valve shown in FIG. 10 will now be explained. In this embodiment, a liquid crystal having bistability such as a ferroelectric liquid crystal is used. The photoconductor 207 has a high resistance if it is not irradiated with light, but the resistance is lowered by light irradiation. When a part of the photoconductor 207 is irradiated with laser light 208 while a voltage is applied between the transparent electrodes 202a and 202b, the electric field applied to the liquid crystal 205 increases with the lowering of the resistance of the photoconductor 207 at the portion which is irradiated with light, and the liquid crystal is only driven at the portion which is irradiated with light.

In this embodiment, since the liquid crystal 205 has bistability with respect to an electric field, the liquid crystal driven above the threshold maintains the writing state even when the voltage applied thereto lowers after light irradiation.

Consequently, it is possible to record image information on the liquid crystal by the raster sweeping by the laser light 208 and to display the image on a screen by projecting rays 209. The ferroelectric liquid crystal has bistability, as described above, and image information is recorded by a binary system representing brightness and darkness.

The stable state of the liquid crystal and the way of corresponding to brightness and darkness for display are different depending upon the structure of the optical projection system 112, but it is here assumed for the purpose of simplifying the explanation that when a positive voltage is applied to the transparent electrode 202b on the photoconductor 207 side, brightness is displayed, while when a negative voltage is applied thereto, darkness is displayed.

FIGS. 11A and 11B show the liquid crystal light valve 105 in this embodiment in the state of data being written thereinto.

In FIG. 11A, data are written on the n-th scanning line, and in FIG. 11B, data are written on the the (n+1)th scanning line. The hatched portions in FIGS. 11A and 11B denote laser spot beams. A writing spot beam 301a and an erasing spot beam 302a are moved from the left to the right in the drawing by the main scanning means 102.

In FIG. 11A, a negative voltage is applied to the liquid crystal light valve 105 by the liquid crystal light valve driving circuit 109, and the portion which is irradiated with light is recorded in a dark state. The writing spot beam 301a is projected onto the portions which correspond to the black portions of the image signal so as to record the black pixels on a white background.

The erasing spot beam 302a is moved onto the (n+1)th scanning line while light is projected thereto so as to change the entire portion of the (n+1)th scanning line to black.

In the next scanning operation, a writing spot beam 301b is moved on the (n+1)th scanning line by the sub scanning means 103. At this time, the liquid crystal light valve driving circuit 109 inverts the polarity of the voltage applied in accordance with the sweep start signal supplied from the timing signal generator 110, and a positive voltage is applied to the liquid crystal light valve 105.

Since the entire part of the (n+1)th scanning line has been changed into black by the erasing spot beam 302a, as described above, the portions irradiated with a writing spot beam 302b are recorded as white portions on the black background.

In this way, since the correspondence of light irradiation to brightness and darkness in FIG. 11B is opposite to that in FIG. 11A, the signal supplied from the image signal generator 106 is supplied to the laser driving circuit 108 after the polarity is inverted by the polarity change-over switch circuit 107, thereby enabling light irradiation at the white portions of the image signal.

FIG. 12 shows the state of the driving signal. In FIG. 12, a liquid crystal light valve driving voltage (a), an image signal (b) and a laser driving signal are shown with the time axis as the abscissa.

The image signal (b) has a periodical waveform consisting of one pixel for white and two pixels for black, and when the liquid crystal light valve driving voltage (a) is negative, the laser driving signal (c) for the black portions of the image signal is turned on, while when the liquid crystal light valve driving voltage (a) is positive, the laser driving signal (c) for the white portions of the image signal is turned on.

In FIG. 11B, the erasing spot beam 302b constantly projects light as in FIG. 11A so as to change the entire portion of the (n+2)th scanning line to white. By repeating the operation shown in FIGS. 11A and 11B with respect to all scanning lines, image rewriting which simultaneously executes erasure and writing is realized.

In the above-described embodiment, it is possible to adopt a different combination of polarities of the image signal, the liquid crystal light valve driving voltage and the laser driving voltage depending upon the structure of the optical projection system. In this case, the fundamental operation is the same.

Although only one erasing spot beam and one writing spot beam are used in this embodiment, a plurality of them may be used. In that case, it is possible to write data on the same number of scanning lines as the number of spot beams in one main scanning operation, and interlaced scanning corresponding to the number of spot beams is necessary in the sub scanning.

In addition, since erasure and writing are only executed at the portion which is irradiated with laser spot beams, if only a part of a scanning line is scanned, partial rewriting is also possible.

Figure 13A:
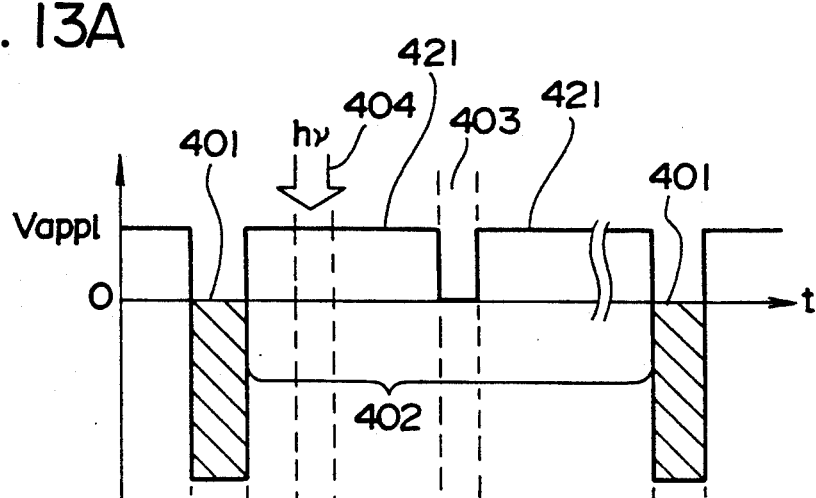
FIGS. 13A to 13C show a change of the voltage and the intensity of reading light with time for explaining the waveform of a driving signal for another embodiment of an optical writing type liquid crystal light valve according to the present invention.
Figure 13B:
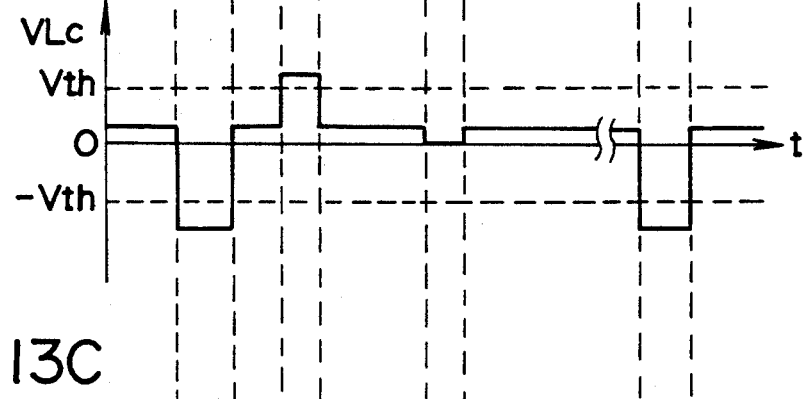

Another embodiment of a writing apparatus for a liquid crystal light valve according to the present invention will be explained hereinunder. The operation of this embodiment is shown in time series in FIGS. 13A to 13C. The time axes are common to FIGS. 13A to 13C. In FIG. 13A, the symbol $V_{appl}$ represents the waveform of the voltage applied between the electrodes, and the reference numeral 401 represents a reset pulse, 402 a writing period, 403 a no voltage applying period, namely, the period in which no voltage is applied during the writing period, and 404 projected writing light. In FIG. 13B, the symbol $V_{LC}$ represents a voltage applied to the liquid crystal layer, and in FIG. 13C, the symbol Irrl represents the intensity of the reflected reading light.

The liquid crystal light valve used for this embodiment may have the same structure as those shown in FIGS. 7 and 8, but the light valve shown in FIG. 10 is also usable. An embodiment used for the liquid crystal light valve shown in FIG. 10 will be explained here. In this embodiment, an obliquely deposited SiO film was used as the liquid crystal orientation films 203a and 203b. For the liquid crystal layer 205, a ferroelectric liquid crystal CS-1014 (produced by Chisso Corporation) was used. The multi-layer dielectric film mirror 206 was produced by laminating a multiplicity of sheets of dielectric film by deposition. As the photoconductor 207, an amorphous silicon film formed by plasma CVD was used. The cell gap of the liquid crystal 205 was set to be 2 μm by using spacers 204a and 204b. As the writing laser beam 208, a semiconductor laser having a wavelength of 670 nm was used.

Figure 3:
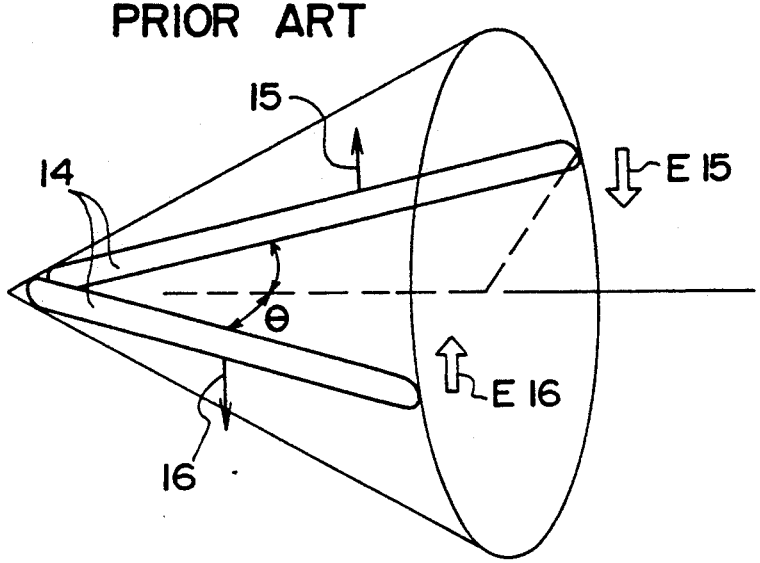
FIG. 3 is an explanatory view of the operation of a ferroelectric liquid crystal.
Figure 4:
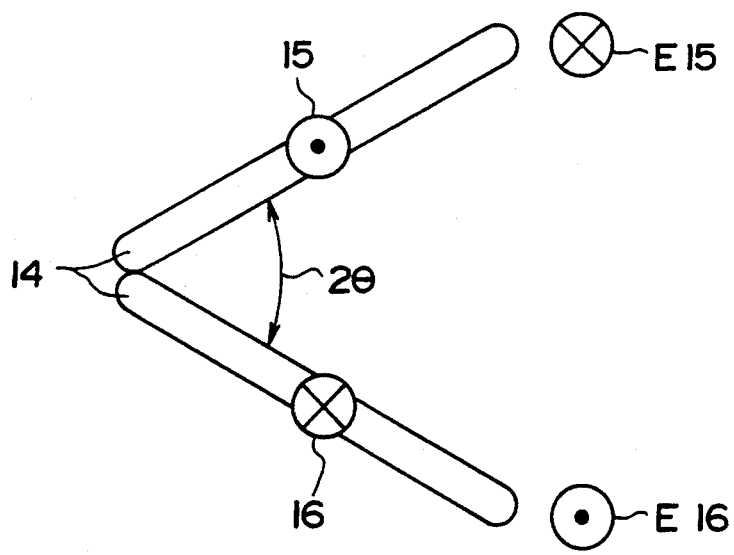
FIG. 4 is a partial enlargement of the explanatory view shown in FIG. 3.
Figure 5A:
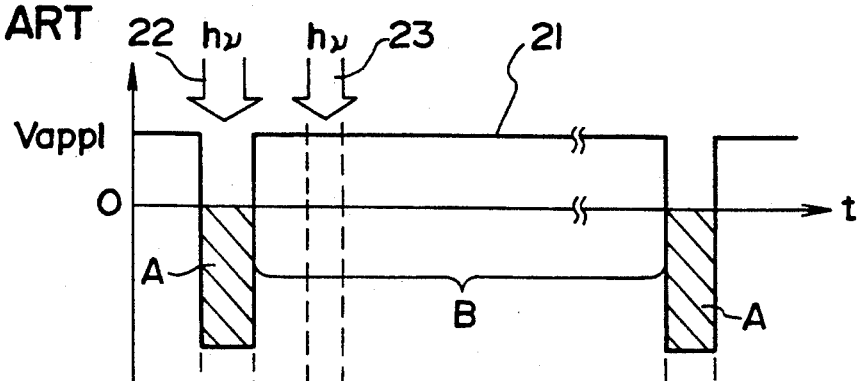
FIGS. 5a to 5c show a change of the voltage and the intensity of reading light with time for explaining a conventional method of driving an optical writing type liquid crystal light valve.
Figure 5B:
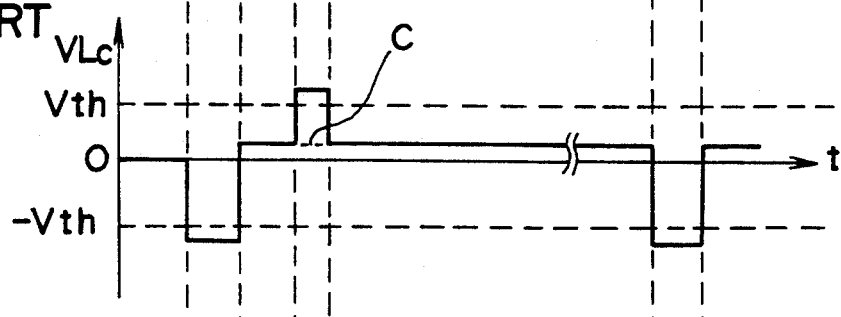
Figure 5C:
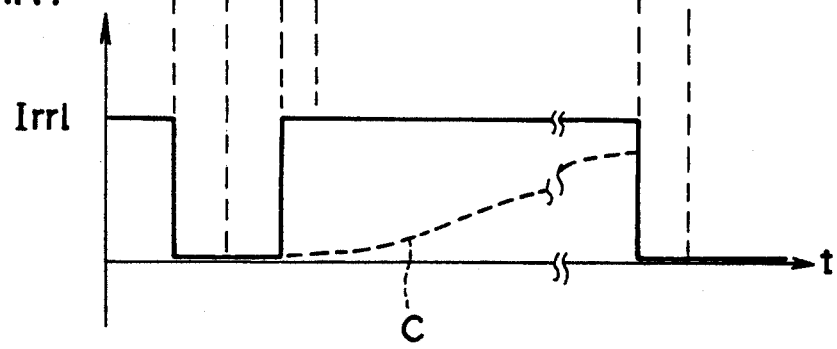
Figure 6:
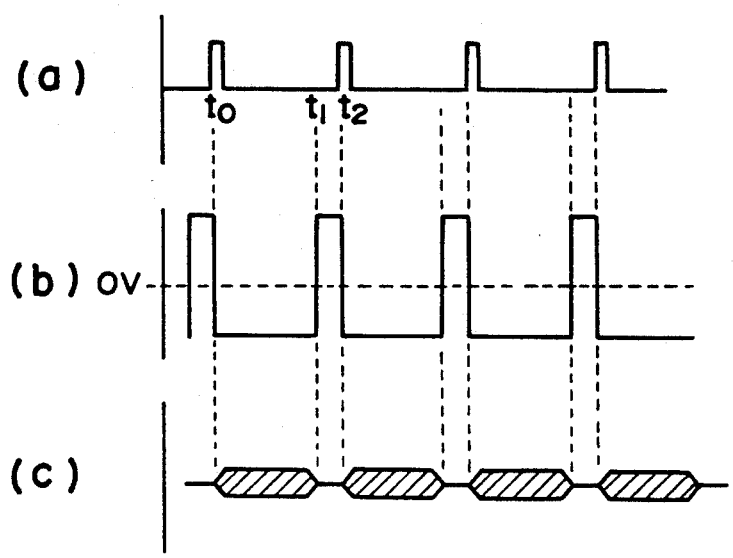
FIG. 6 is a timing chart of the procedure for writing data into a conventional liquid crystal light valve.
Figure 13C:
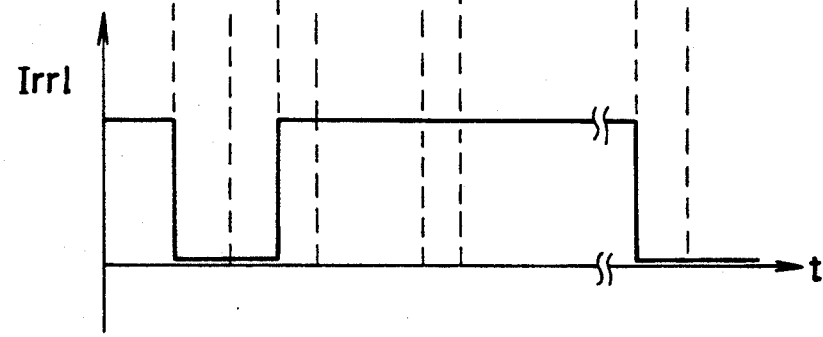

The operation of this embodiment will now be explained. In FIGS. 13A to 13C, a pulse having a sufficiently high voltage (e.g., 20 V) and a sufficiently large time width (e.g., 0.8 msec) for making the entire portion of the liquid crystal layer a dark state even if it is not irradiated with light, namely the reset pulse 401, was applied between the electrodes. The other fundamental operation was the same as in the related art shown in FIGS. 5a to 5c. In writing, an optical pulse having a width of 100 ns was projected for each dot for two-dimensional scanning. After 1500 writing pulses were written in the main scanning direction, no voltage was applied for a period of 100 μsec. The same writing operation was repeated on the next scanning line. When a voltage having the waveform shown in FIGS. 5a to 5c was applied, the orientation of the liquid crystal was inverted even at the portion which was not irradiated with light. In contrast, in this embodiment, by setting a no voltage applying period during the process of optical scanning, the orientation of the liquid crystal layer was not inverted at the portion which was not irradiated with light. In this embodiment, immediately after the writing period 402 for one frame, the next reset pulse 401 was applied, but a no voltage applying period may be set between these periods in order to maintain the image.

Although 1500 writing pulses were applied before the no voltage applying period in this embodiment, the number of writing pulses applied before the no voltage applying period may fundamentally be determined as anywhere in the range which does not cause the inversion of the liquid crystal at the portion which is not irradiated with light. It is therefore possible to set a no voltage applying period after the application of each writing pulse, but it is preferable from the point of view of practicality such as the rewriting time that a no voltage applying period is set after the application of not less than 500 writing pulses. On the other hand, if it is assumed that the time obtained by dividing the CPA by the voltage applied to the liquid crystal at the portion which is not irradiated with light is the threshold time of the portion which is not irradiated with light, and that the value obtained by dividing the threshold time by the width of the writing pulse is a critical number of writing pulses, since the liquid crystal at the portion which is not irradiated with light inverts if the number of writing pulses exceeds the critical number of writing pulses, it is preferable that the number of writing pulses is not more than 90% of the critical number of writing pulses.

Although 100 μsec is set as the no voltage applying period, the no voltage applying period is not restricted thereto. Since the existence of the no voltage applying time sufficiently separates the writing voltage pulses and shortens the writing time, it may take any value in the range of 50 μsec to 300 μsec.

In this embodiment, the no voltage applying period is set on every line, but it may be set in the process of writing data on only one line, or on every few lines.

A liquid crystal light valve utilizing the reflection of reading light by the multi-layer dielectric film mirror 206 is described in this embodiment, but the present invention is also applicable to a transmission type liquid crystal light valve which is not provided with a reading light reflecting film.

Although the liquid crystal was initialized to an orientation stable state of an entirely dark state and optical recording (positive formation) was carried out by changing the dark state into a bright state in this embodiment, the liquid crystal may be initialized to an orientation stable state of an entirely bright state and optical writing (negative formation) may be carried out by changing the bright state into a dark state. Alternatively, optical writing both in a dark state and in a bright state without initialization is also possible.

In this embodiment, the photoconductor 207 consists of an amorphous silicon film, but the photoconductor 207 may have a pin structure or it may be a laminate of an amorphous silicon film and an inorganic oxide film provided between the amorphous silicon film and the transparent electrode. In the case of adopting a pin structure, erasure (orientation to a dark state) is carried out by applying a forward voltage while writing is carried out by applying an inverse voltage.

Even in the embodiments shown in FIGS. 9 to 12 in which the polarity is inverted on every horizontal line, charges are sometimes stored. In this case, it is preferable to set the no voltage applying period in the process of writing data on one line.

While there has been described what are at present considered to be preferred embodiments of the invention, it will be understood that various modifications may be made thereto, and it is intended that the appended claims cover all such modifications as fall within the true spirit and scope of the invention.

What is claimed:

1. An optical writing type liquid crystal light valve comprising:
    a pair of electrodes;
    a photoconductive layer having a conductivity which changes according to light irradiation; and
    a liquid crystal layer having a molecular alignment which changes in accordance with an applied voltage;
    said liquid crystal layer and said photoconductive layer being positioned between said pair of electrodes;
    said photoconductive layer including,
        an inorganic insulating film, and
        a laminate of amorphous Si films;
    said inorganic insulating film being formed closest to one of said electrodes;
    said laminate of amorphous Si films being formed closest to said liquid crystal layer.

2. The optical writing type liquid crystal light valve as claimed in claim 1, wherein said inorganic insulating film is an $SiO_2$ film.

3. The optical writing type liquid crystal light valve as claimed in claim 1, wherein said inorganic insulating film has a thickness between 20 to 200 nm.

* * * * *